United States Patent
Lee

(10) Patent No.: US 9,100,829 B2
(45) Date of Patent: Aug. 4, 2015

(54) APPARATUS AND METHOD FOR MANAGING CONTROL INFORMATION OF APPLICATION IN PORTABLE TERMINAL

(71) Applicant: Samsung Electronics Co., Ltd., Gyeonggi-do (KR)

(72) Inventor: Myoung-Ju Lee, Gyeonggi-do (KR)

(73) Assignee: Samsung Electronics Co., Ltd., Yeongtong-gu, Suwon-si, Gyeonggi-do (KR)

( * ) Notice: Subject to any disclaimer, the term of this patent is extended or adjusted under 35 U.S.C. 154(b) by 0 days.

(21) Appl. No.: 13/647,831

(22) Filed: Oct. 9, 2012

(65) Prior Publication Data
US 2013/0102280 A1   Apr. 25, 2013

(30) Foreign Application Priority Data
Oct. 10, 2011  (KR) .................. 10-2011-0103071

(51) Int. Cl.
*H04M 1/66* (2006.01)
*H04W 12/08* (2009.01)
*G06F 21/51* (2013.01)

(52) U.S. Cl.
CPC .............. *H04W 12/08* (2013.01); *G06F 21/51* (2013.01)

(58) Field of Classification Search
USPC ........... 455/410, 411; 717/126, 174, 168, 170
See application file for complete search history.

(56) References Cited

U.S. PATENT DOCUMENTS

| 2006/0101408 | A1* | 5/2006 | Kotamarthi et al. | 717/126 |
| 2006/0116175 | A1* | 6/2006 | Chu | 455/567 |
| 2006/0143606 | A1* | 6/2006 | Smith et al. | 717/175 |
| 2006/0205385 | A1* | 9/2006 | Davydov et al. | 455/411 |
| 2007/0240194 | A1* | 10/2007 | Hargrave et al. | 726/1 |
| 2010/0050271 | A1* | 2/2010 | Saarisalo | 726/28 |
| 2011/0065419 | A1* | 3/2011 | Book et al. | 455/411 |

FOREIGN PATENT DOCUMENTS

| EP | 1 956 509 | * | 8/2008 |
| EP | 1 956 509 A1 | | 8/2008 |
| WO | 2006/043143 A2 | | 4/2006 |
| WO | 2006/095247 A1 | | 9/2006 |

* cited by examiner

*Primary Examiner* — Nathan Mitchell
*Assistant Examiner* — Sayed T Zewari
(74) *Attorney, Agent, or Firm* — Cha & Reiter, LLC

(57) ABSTRACT

An apparatus and method to control an application in a portable terminal are provided. A method to manage an application includes confirming control information that at least one application installed in the portable terminal requires, selecting the at least one application requiring control information whose use is restricted among a plurality of applications installed in the portable terminal, and restricting a running of the selected at least one application.

13 Claims, 6 Drawing Sheets

APPARATUS AND METHOD FOR MANAGING CONTROL INFORMATION OF APPLICATION IN PORTABLE TERMINAL

CLAIM OF PRIORITY

This application claims priority under 35 U.S.C. §119(a) to a Korean Patent Application filed in the Korean Intellectual Property Office on Oct. 10, 2011 and assigned Serial No. 10-2011-0103071, the contents of which are herein incorporated by reference in its entirety.

BACKGROUND OF THE INVENTION

1. Field of the Invention

The present invention relates to a portable terminal. More particularly, the present invention relates to an apparatus and method to manage control information of an application installed in a portable terminal.

2. Description of the Related Art

Portable terminals are becoming a necessity of users due to the easiness of carriage along with such portable terminals providing a voice and video call function, an information input/output function, and a function such as data storage.

Due to the growth of general technologies of a wired/wireless communication technology, a multimedia technology, a manufacturing technology of hardware such as a Central Processing Unit (CPU) and a memory, and the like, the portable terminals can install an application desired by a user and provide various services.

However, there is an inconvenience that, when a problem occurs in any application among various applications installed in a portable terminal, a user of the portable terminal has to confirm control information of each application and also search the problematic application.

Accordingly, there is a need for an apparatus and/or method wherein a user only needs to confirm control information of the problematic application and search the problematic application when a problem occurs with an application among a plurality of applications installed in a portable terminal.

SUMMARY OF THE INVENTION

An exemplary aspect of the present invention is to substantially solve at least the above problems and/or disadvantages and to provide at least the advantages below. Accordingly, one exemplary aspect of the present invention is to provide an apparatus and method to manage control information of an application in a portable terminal.

Another exemplary aspect of the present invention is to provide an apparatus and method to construct control information of an application as a DataBase (DB) in a portable terminal.

A further exemplary aspect of the present invention is to provide an apparatus and method to control the running of an application using a control information DB of the application in a portable terminal.

Yet another exemplary aspect of the present invention is to provide an apparatus and method to delete an application using a control information DB of the application in a portable terminal.

Still another exemplary aspect of the present invention is to provide an apparatus and method to control the installation of an application considering the control information of the application in a portable terminal.

The above exemplary aspects are achieved by providing an apparatus and method to manage the control information of an application in a portable terminal.

According to one exemplary aspect of the present invention, a method to control an application in a portable terminal is provided. The method includes confirming control information that at least one application installed in the portable terminal requires service and/or removal, selecting the at least one application requiring control information whose use is restricted among a plurality of applications installed in the portable terminal, and restricting the running of the selected application.

According to another exemplary aspect of the present invention, a method to install an application in a portable terminal is provided. The method includes confirming control information that an application to be installed in the portable terminal requires service, and when the application requires control information whose use is restricted among a plurality of applications, blocking the installation of the application.

According to a further exemplary aspect of the present invention, an apparatus to control an application in a portable terminal is provided. The apparatus includes a storage unit to store control information that at least one application installed in the portable terminal requires, and a controller to select the at least one application requiring control information whose use is restricted among a plurality of applications installed in the portable terminal, and restricting the running of the selected application.

According to yet another exemplary aspect of the present invention, an apparatus to install an application in a portable terminal is provided. The apparatus includes a display unit to display information of an application to be installed in the portable terminal, and a controller to confirm control information that the application to be installed in the portable terminal requires, and when the application requires control information whose use is restricted, blocking the installation of the application.

BRIEF DESCRIPTION OF THE DRAWINGS

The above and other exemplary aspects, features and advantages of the present invention will become more apparent from the following detailed description when taken in conjunction with the accompanying drawings in which.

DETAILED DESCRIPTION OF EXEMPLARY EMBODIMENTS

Exemplary embodiments of the present invention will now be described herein below with reference to the accompanying drawings. In the following description, well-known functions or constructions may not be described in detail since they would obscure the appreciation of the present invention by a person of ordinary skill in the art with in unnecessary detail of the well-known functions and structures. And, terms used herein are defined below according to the functions in the present invention as would be understood by a person of ordinary skill in the art, can be different depending on the user and operator's intention or practice. Therefore, the terms should be defined on the basis of the disclosure throughout this specification in view of the ordinary level of skill in the art.

The present invention relates to an apparatus and method to manage control information necessary to provide service to an application in a portable terminal.

In the following description, the portable terminal includes a mobile communication terminal, a Personal Digital Assistant (PDA), a laptop computer, a smartphone, a netbook, a Mobile Internet Device (MID), a Ultra Mobile Personal Computer (UMPC), a tablet PC, an MPEG Audio Layer-3 (MP3) player, a Portable Multimedia Player (PMP), a navigation and the like.

The following description is made on the assumption that control information of an application is managed in a portable terminal including a communication module. Here, the control information, which is information necessary for the portable terminal to provide service using an application, includes a permission to use the application.

Figure 1:
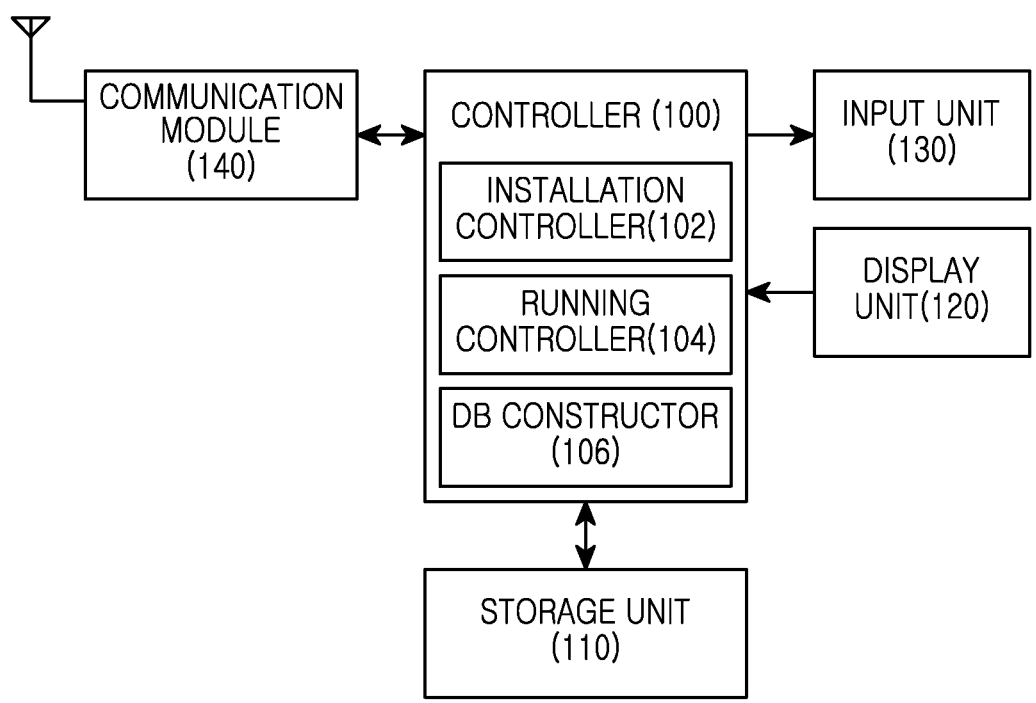
FIG. 1 is a block diagram illustrating a construction of a portable terminal according to the present invention.

FIG. 1 illustrates a construction of a portable terminal according to the present invention.

Referring to FIG. 1, the portable terminal includes a controller 100, a storage unit 110, a display unit 120, an input unit 130, and a communication module 140.

The controller 100 performs the whole operation control of the portable terminal. Also, the controller 100 controls the installation, running, and deletion of an application. For example, the controller 100 controls the installation, running, and deletion of an application using an installation controller 102, a running controller 104, and a database (DB) constructor 106.

Figure 6B:
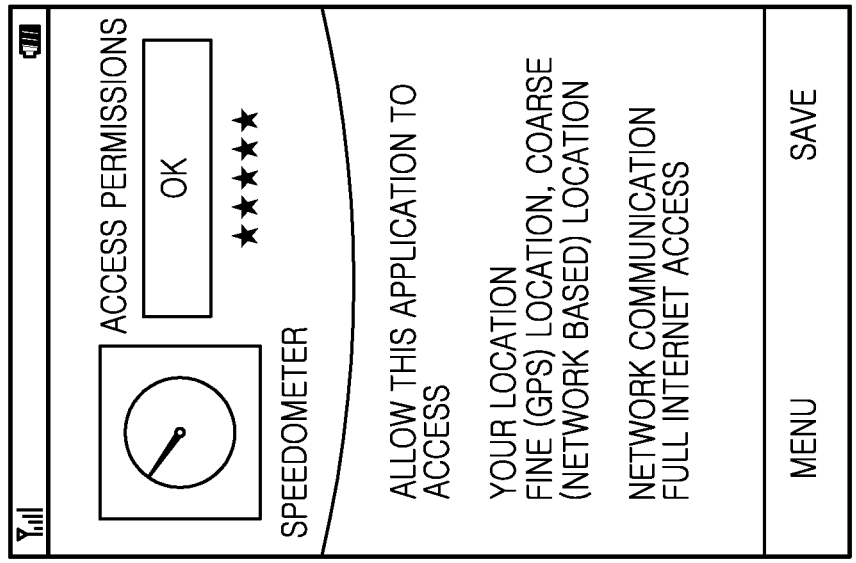
FIG. 6B is a diagram illustrating a second screen configuration to select an application to be installed in a portable terminal according to an exemplary embodiment of the present invention.
Figure 6A:
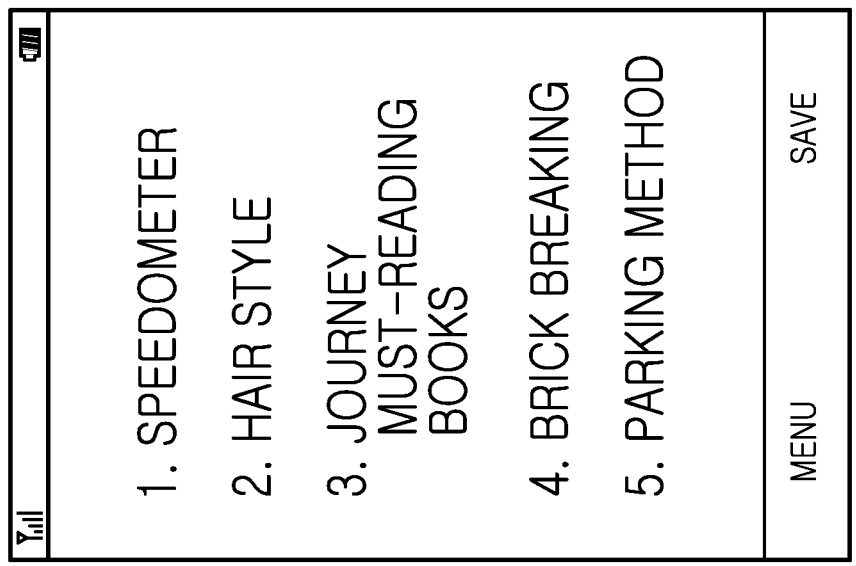
FIG. 6A is a diagram illustrating a first screen configuration to select an application to be installed in a portable terminal according to an exemplary embodiment of the present invention.

The installation controller 102 determines the installation or non-installation of an application considering the control information of the application intended to be installed in the portable terminal. For example, referring to FIG. 6A, when an application "speedometer" is selected in a list of applications installable in the portable terminal as illustrated in FIG. 6A, the installation controller 102 displays a description of the application "speedometer" on the display unit 120 as illustrated in FIG. 6B. In an exemplary embodiment, the installation controller 102 recognizes that the user location information of the portable terminal is necessary to provide service to the application "speedometer," through a text recognition of the description of the application "speedometer" displayed on the display unit 120. That is, the installation controller 102 recognizes the user location information of the portable terminal as the control information of the application "speedometer".

If the user location information of the portable terminal, which is the control information of the application "speedometer," is included in the management control information, the installation controller 102 blocks the installation of the application "speedometer" or provides an alarm message to a user. Alternatively, if the user location information of the portable terminal, which is the control information of the application "speedometer," is not included in the management control information, the installation controller 102 installs the application "speedometer." Here, the management control information represents at least one portion of control information whose use is restricted among control information such as user identification information available to provide service in the portable terminal, user location information of the portable terminal, and the like.

The running controller 104 controls the running and deletion of at least one application installed in the portable terminal. For example, when management control information to restrict running is selected, the running controller 104 confirms the control information of each application installed in the portable terminal in a control information DB stored in the storage unit 110. If an application using management control information as control information exists, the running controller 104 restricts service of the application using the management control information. For another example, the running controller 104 may restrict the running of a corresponding application. Further, the running controller 104 may also delete a corresponding application.

The DB constructor 106 constructs a control information DB including control information of an application installed in the portable terminal and stores the control information DB in the storage unit 110. For example, when a new application is installed in the portable terminal, the DB constructor 106 adds the control information of the newly installed application to the control information DB. In an exemplary embodiment, the DB constructor 106 may be provided with the control information of the newly installed application from the installation controller 102, or extract the control information from the newly installed application. In addition, when an application is deleted from the portable terminal, the DB constructor 106 may eliminate control information of the deleted application from the control information DB.

The storage unit 110 can be composed of a program storage unit to store a program to control an operation of the portable terminal, and a data storage unit to store data generated during the execution of a program. For instance, the storage unit 110 stores a control information DB created and updated in the DB constructor 106.

The display unit 120 displays status information of the portable terminal, a character input by a user, a moving picture, a still picture, and the like. For example, the display unit 120 displays a list of applications installable in the portable terminal as illustrated in FIG. 6A. If an application "speedometer" is selected in the list of applications installable in the portable terminal, the display unit 120 displays a description of the application "speedometer," i.e., a list of control information as illustrated in FIG. 6B.

The input unit 130 provides input data generated by user's selection to the controller 100. For instance, the input unit 130 provides application information selected by a user, to the controller 100.

The communication module 140 processes a signal transmitted/received through an antenna for voice and data communication.

Although not illustrated, the variety of devices which mentioned above that can include the portable terminal can further include an audio processor to control input/output of an audio signal, a microphone to receive an input of an audio signal, and a speaker to output an audio signal.

Figure 2:
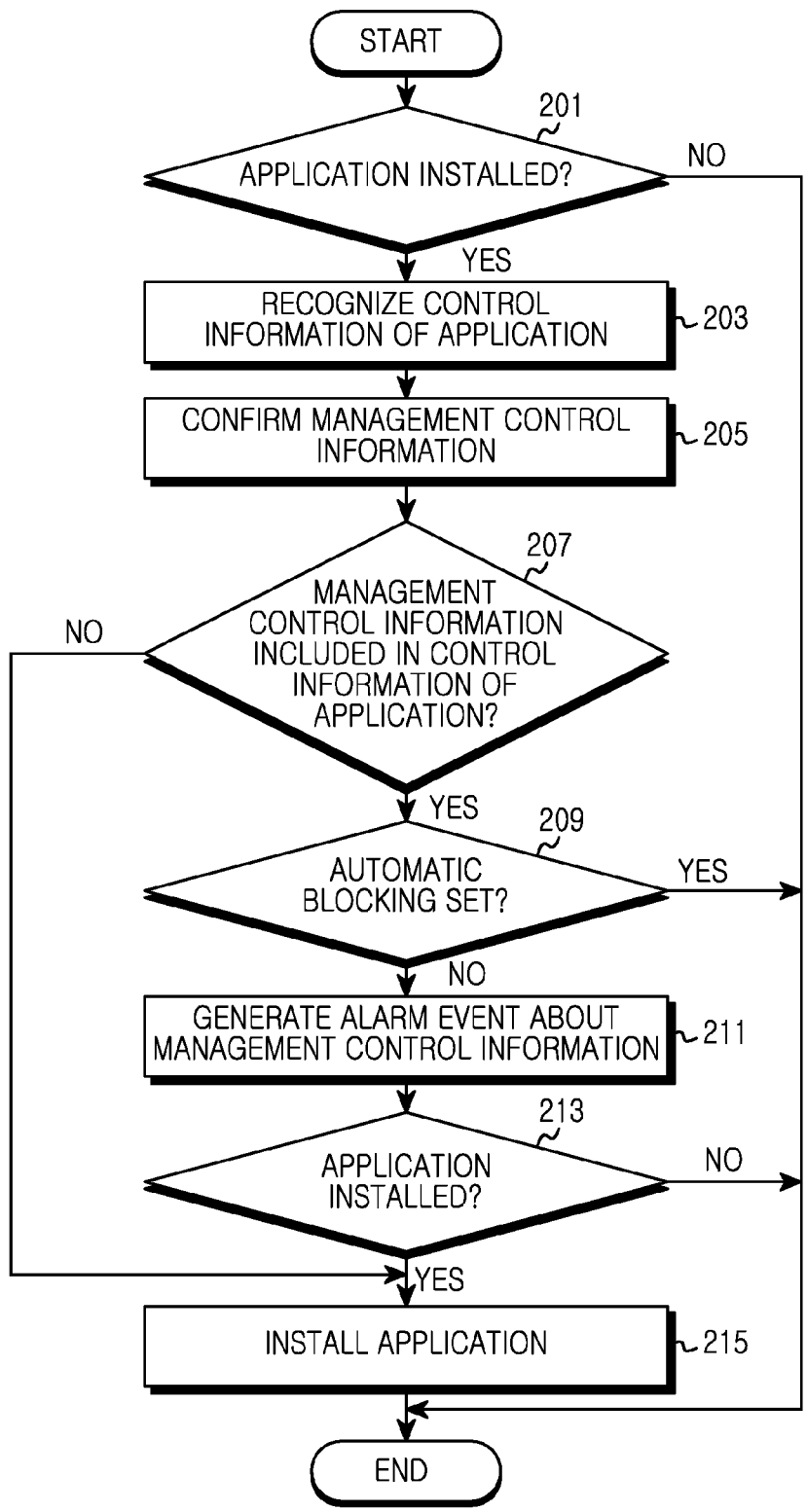
FIG. 2 is a flowchart illustrating a procedure to install an application in a portable terminal according to an exemplary embodiment of the present invention.

FIG. 2 illustrates a procedure to install an application in a portable terminal according to an exemplary embodiment of the present invention.

As illustrated in FIG. 2, in step 201, the portable terminal checks if an application installation event occurs. For example, the portable terminal displays a list of applications installable in the portable terminal on the display unit 120 as illustrated in FIG. 6A. After that, the portable terminal checks if any one application is selected in the list of applications.

If an application installation event does not occur in step 201, the portable terminal recognizes that it does not install an application. Accordingly, the portable terminal terminates the algorithm according to the present invention.

In the alternative, if the application installation event occurs in step 201, the portable terminal recognizes that an application to be installed in the portable terminal is selected. Accordingly, the portable terminal proceeds to step 203 and confirms control information of the application to be installed in the portable terminal. For example, when an application "speedometer" is selected in a list of applications installable in the portable terminal illustrated in FIG. 6A, the portable terminal displays a description of the application "speedometer" on the display unit 120 as illustrated in FIG. 6B. In an exemplary embodiment, the portable terminal recognizes that the user location information of the portable terminal is necessary to provide service using the application "speedometer," through a text recognition of the description of the application "speedometer" displayed on the display unit 120. That is, the portable terminal recognizes the user location information of the portable terminal as the control information of the application "speedometer,"

After confirming the control information of the application, the portable terminal proceeds to step 205 and confirms management control information. Here, the management control information includes at least one portion of control information whose use is restricted among control information available to provide service in the portable terminal.

After that, the portable terminal proceeds to step 207 and checks if the management control information is included in the control information of the application intended to be installed in the portable terminal.

If in step 207, that the management control information is not included in the control information of the application intended to be installed in the portable terminal, the portable terminal jumps to step 215 and installs the application selected in step 201. In an exemplary embodiment, the portable terminal updates a control information DB to include the control information of the application.

In the alternative, if in step 207 the management control information is included in the control information of the application intended to be installed in the portable terminal, the portable terminal proceeds to step 209 and checks if an automatic blocking menu against the application requiring the management control information has been set to block the installation of the application.

If in step 209 the automatic blocking menu has been set, the portable terminal recognizes the automatic blocking menu and blocks the installation of the application requiring the management control information. Accordingly, the portable terminal terminates the algorithm according to the present invention.

Alternatively, if in step 209 the automatic blocking menu has not been set, the portable terminal proceeds to step 211 and generates an alarm event about the management control information. For example, the portable terminal generates at least one of an installation alarm message to the application requiring the management control information and one of an installation alarm sound to the application requiring the management control information.

Next, the portable terminal proceeds to step 213 and determines whether to install the application requiring the management control information. For example, after generating the alarm event, the portable terminal checks if the user's instruction information to install the application requiring the management control information is sensed.

When a user does not accept the installation of the application requiring the management control information, the portable terminal recognizes the user's choice and blocks the installation of the application requiring the management control information. Accordingly, the portable terminal terminates the algorithm according to the present invention. In an exemplary embodiment, after generating the alarm event, when the instruction information of the installation of the application requiring the management control information is not sensed during a reference time, the portable terminal can recognize that it does not accept the installation of the application.

In the alternative, when the user accepts the installation of the application requiring the management control information, the portable terminal proceeds to step 215 and installs the application selected in step 201. Next, the portable terminal terminates the algorithm according to the present invention. In the aforementioned exemplary embodiment, when the management control information is included in the control information of an application intended to be installed in a portable terminal, the portable terminal checks if an automatic blocking menu against the application has been set (step 209).

Further, in another exemplary embodiment, when the management control information is included in the control information of an application intended to be installed in a portable terminal, the portable terminal may automatically block the installation of the application. For instance, when the management control information is included in the control information of the application intended to be installed in the portable terminal in step 207 of FIG. 2, the portable terminal recognizes the management control information and automatically blocks the installation of the application. According to this embodiment, the portable terminal omits the operations of step 209 to step 213 of FIG. 2 and terminates the algorithm according to the present invention.

In a further exemplary embodiment, when the management control information is included in the control information of an application intended to be installed in a portable terminal, the portable terminal may generate an alarm event about the management control information. For example, when the management control information is included in the control information of an application intended to be installed in a portable terminal in step 207 of FIG. 2, the portable terminal jumps to step 211 and generates an alarm event. That is, the portable terminal may omit step 209 of FIG. 2 and not determine if an automatic blocking menu has been set.

Figure 3:
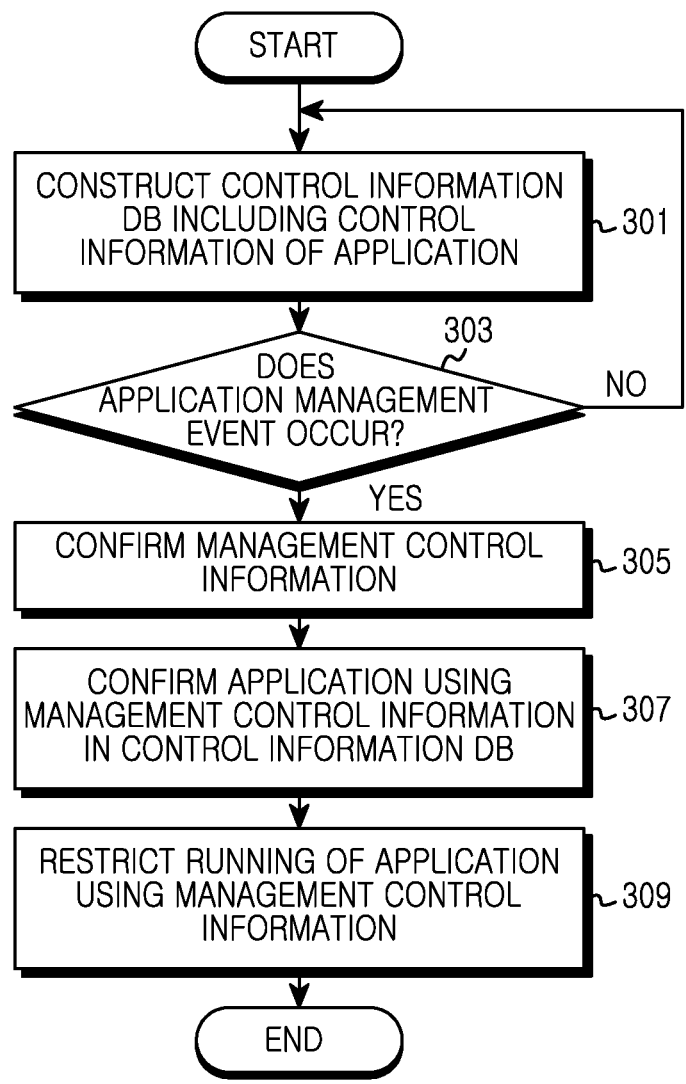
FIG. 3 is a flowchart illustrating a procedure to restrict the running of an application in a portable terminal according to an exemplary embodiment of the present invention.

FIG. 3 illustrates a procedure to restrict the running of an application in a portable terminal according to an exemplary embodiment of the present invention.

As illustrated in FIG. 3, in step 301, the portable terminal constructs a control information DB including control information of at least one application installed in the portable terminal. For example, when a new application is installed, the portable terminal updates the control information DB to include the control information of the newly installed application. For another example, when an application is deleted, the portable terminal eliminates the control information of the deleted application from the control information DB.

Next, the portable terminal proceeds to step 303 and checks if an application management event occurs. For instance, the portable terminal checks if an application management menu has been selected by a user.

If in step 303 the application management event does not occur, the portable terminal returns to step 301 and continuously constructs and updates the control information DB.

In the alternative, if in step 303 the application management event occurs, the portable terminal proceeds to step 305 and confirms the management control information. Here, the management control information includes at least one portion of control information whose use is restricted among control information available to provide service in the portable terminal.

Next, the portable terminal proceeds to step 307 and compares the control information of the application included in the control information DB with the management control information, and confirms the application requiring the management control information After confirming the application requiring the management control information the portable terminal proceeds to step 309 and restricts the running of the application requiring the management control information.

Next, the portable terminal terminates the algorithm according to the present invention. Further, although not illustrated, after restricting the running of the application requiring the management control information, the portable terminal may activate the application if an application activation event occurs.

In the aforementioned exemplary embodiment, after confirming an application requiring management control information (step 307), a portable terminal restricts the running of the application requiring the management control information. If the application requiring the management control information does not exist in step 307, the portable terminal may omit step 309 and terminate the algorithm according to the present invention.

Figure 4:
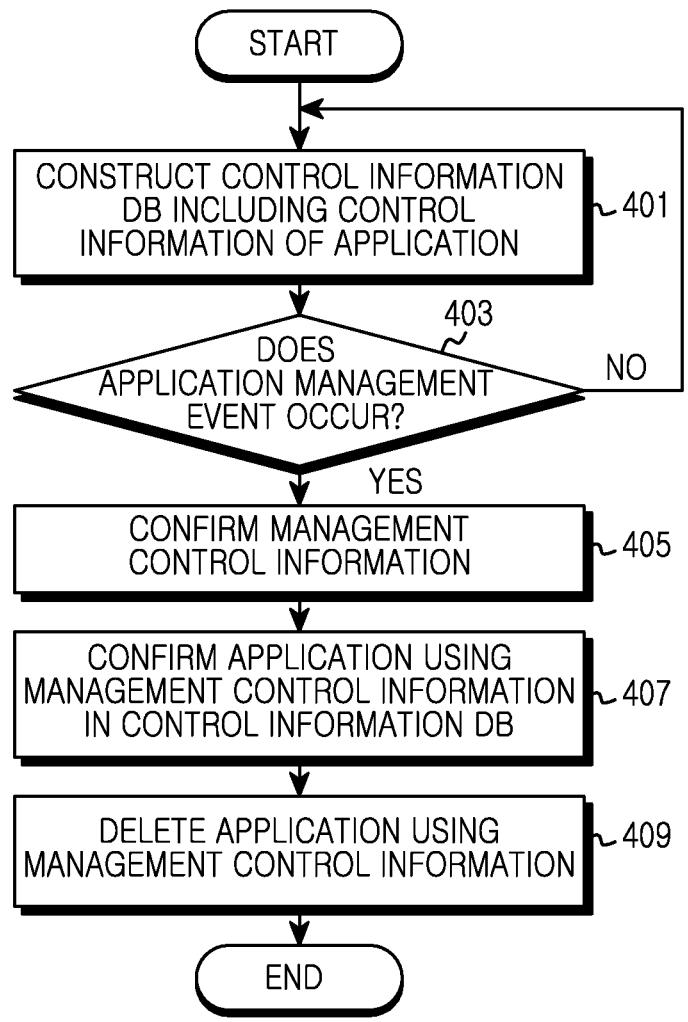
FIG. 4 is a flowchart illustrating a procedure to delete an application in a portable terminal according to an exemplary embodiment of the present invention.

FIG. 4 illustrates a procedure to delete an application in a portable terminal according to an exemplary embodiment of the present invention.

As illustrated in FIG. 4, in step 401, the portable terminal constructs a control information DB including control information of at least one application installed in the portable terminal. For example, when a new application is installed, the portable terminal updates the control information DB to include the control information of the newly installed application. For another example, when an application is deleted, the portable terminal eliminates the control information of the deleted application from the control information DB.

Next, the portable terminal proceeds to step 403 and checks if an application management event occurs. More specifically, the portable terminal checks if an application management menu has been selected by a user.

If in step 403 the application management event does not occur, the portable terminal returns to step 401 and continuously constructs and updates the control information DB.

Alternatively, if in step 403 the application management event occurs, the portable terminal proceeds to step 405 and confirms management control information. Here, the management control information includes at least one portion of control information whose use is restricted among control information available to provide service in the portable terminal.

Next, the portable terminal proceeds to step 407 and compares the control information of the application included in the control information DB with the management control information, and confirms the application requiring the management control information.

After confirming the application requiring the management control information, the portable terminal proceeds to step 409 and deletes the application requiring the management control information. In the exemplary embodiment, the portable terminal eliminates the control information of the deleted application from the control information DB. Next, the portable terminal terminates the algorithm according to the present invention. In the aforementioned exemplary embodiment, after confirming an application requiring the management control information (step 407), a portable terminal proceeds to step 409 and deletes the application requiring the management control information. If the application requiring the management control information does not exist in step 407, the portable terminal may omit step 409 and terminate the algorithm according to the present invention.

Figure 5:
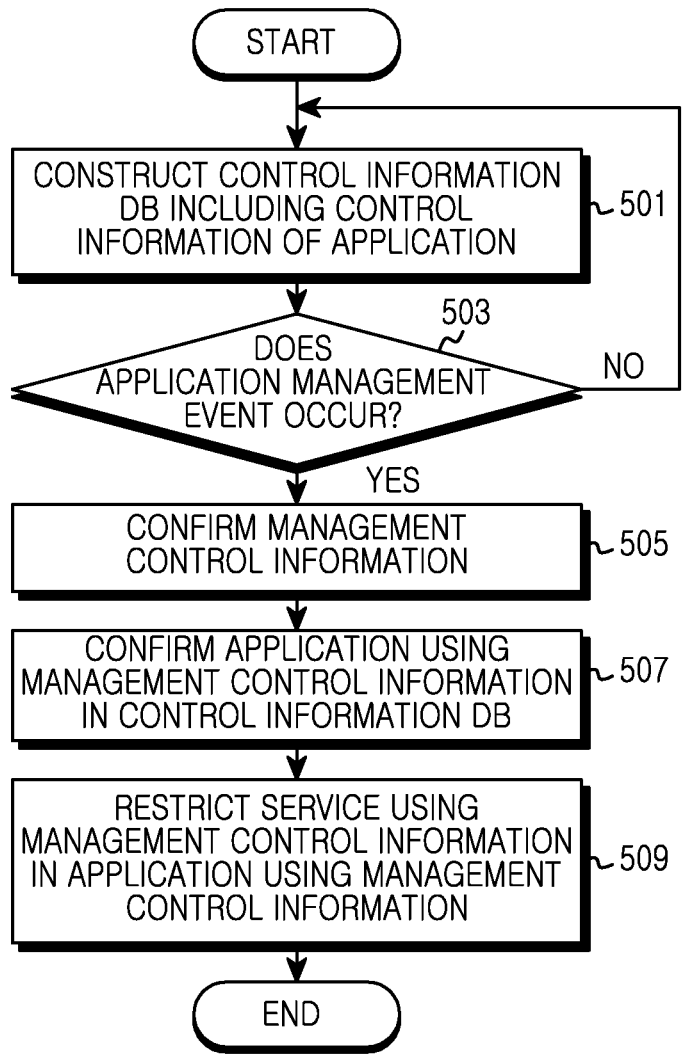
FIG. 5 is a flowchart illustrating a procedure to restrict service of an application in a portable terminal according to an exemplary embodiment of the present invention.

FIG. 5 illustrates a procedure to restrict service of an application in a portable terminal according to an exemplary embodiment of the present invention.

As illustrated in FIG. 5, in step 501, the portable terminal constructs a control information DB including control information of at least one application installed in the portable terminal. For example, when a new application is installed, the portable terminal updates the control information DB to include control information of the newly installed application. In addition, when an application is deleted, the portable terminal eliminates control information of the deleted application from the control information DB.

Next, the portable terminal proceeds to step 503 and checks if an application management event occurs. For instance, the portable terminal checks if an application management menu has been selected by a user.

If in step 503 the application management event does not occur, the portable terminal returns to step 501 and continuously constructs and updates the control information DB.

Alternatively, if in step 503 the application management event occurs, the portable terminal proceeds to step 505 and confirms the management control information. Here, the management control information includes at least one portion of control information whose use is restricted among the control information available to provide service in the portable terminal.

Next, the portable terminal proceeds to step 507 and compares the control information of the application included in the control information DB with the management control information, and confirms the application requiring the management control information.

After confirming the application requiring the management control information, the portable terminal proceeds to step 509 and restricts service using the management control information in the application.

Next, the portable terminal terminates the algorithm according to the present invention.

In addition, although not illustrated, after restricting the running of the application requiring the management control information, the portable terminal may activate the application if an application activation event occurs.

In the aforementioned exemplary embodiment, after confirming an application requiring management control information (step 507), a portable terminal proceeds to step 509 and restricts service using the management control information in the application. Further, if the application does not exist in step 507, the portable terminal may omit step 509 and terminate the algorithm according to the present invention.

As described above, there is an advantage that, by constructing and managing control information of an application as a database in a portable terminal, a user can easily manage control information of an application installed in the portable terminal and can strengthen the security of the portable terminal.

Also, there is an advantage of, by automatically recognizing control information of an application and controlling installation of a corresponding application, being capable of preventing installation of an unnecessary and potentially harmful application and reinforcing security.

While the invention has been shown and described with reference to certain preferred embodiments thereof, it will be understood by those skilled in the art that various changes in form and details may be made therein without departing from the spirit and scope of the invention as defined by the appended claims.

What is claimed is:

1. A method for controlling an operation of an electronic device, comprising:
   storing a database including information on each of a plurality of applications installed in the electronic device using at least one of a plurality of control information, wherein each of the plurality of control information is generated or managed by another application which is different from the at least one application using the each of the plurality of control information;
   detecting an input for an application management event, wherein the input for the application management event comprises a selection of one control information among stored control information in the database;
   identifying at least one application, using the selected control information to provide service of the at least one application;
   restricting operation of the service for the identified at least one application using the selected control information,
   wherein the control information represent data requiring to provide service of an application, and wherein the database is updated by installing a new application and uninstalling at least one of the plurality of applications installed in the electronic device.

2. The method of claim 1, wherein identifying at least one application comprises:
   identifying at least one application, among the plurality of applications, using the selected control information to provide service of the at least one application based on the stored information on each of the plurality of application in the database.

3. The method of claim 1, wherein restricting the operation of the service for the identified at least one application comprises: deleting the identified at least one application.

4. A method to install an application in an electronic device, the method comprising:
   in response to detecting a request for an application installation, identifying at least one control information, wherein the at least one control information represent data requiring to provide service of the application;
   determining whether the identified at least one control information is included in restricted control information, wherein the restricted control information represent at least one control information whose use is restricted among a plurality of control information; and
   blocking the installation of the application when the identified at least one control information is included in the restricted control information.

5. The method of claim 4, further comprising:
   installing the application when the identified at least one control information is not included in the restricted control information; and
   adding information of the installed application to a database of the electronic device,
   wherein the database includes information on each of a plurality of applications installed in the electronic device using at least one of a plurality of control information.

6. An electronic device, comprising:
   a memory configured to store a database including information on each of a plurality of applications installed in the electronic device using at least one of a plurality of control information, wherein each of the plurality of control information is generated or managed by another application which is different from the at least one application using the each of the plurality of control information; and
   a controller configured to:
   detect a input for an application management event, wherein the input for the application management event comprises a selection of one control information among stored control information in the database,
   identify at least one application, among the plurality of applications, using the selected control information to provide service of the at least one application, and
   restrict operation of the service for the identified at least one application using the selected control information,
   wherein the control information represent data requiring to provide service of an application, and
   wherein the database is updated by installing new application and uninstalling at least one of the plurality of applications installed in the electronic device.

7. The electronic device of claim 6, wherein the controller is configured to identify at least one application, among the plurality of applications, using the selected control information to provide service of the at least one application based on the stored information on each of the plurality of application in the database.

8. The electronic device of claim 6, wherein the selected control information includes at least one of user related information or location information.

9. An electronic device, comprising:
   a display configured to display information of an application to be installed in the electronic device; and
   a controller configured to:
   in response to detecting a request for an application installation, identify at least one control information, wherein the at least one control information represent data requiring to provide service of the application,
   determine whether the identified at least one control information is included in restricted control information, wherein the restricted control information represent at least one control information whose use is restricted among a plurality of control information, and
   block the installation of the application when the identified at least one control information is included in the restricted control information.

10. The electronic device of claim 9, wherein, the controller is configured to install the application when the identified at least one control information is not included in the restricted control information, and adds information of the installed application to a database of the electronic device, wherein the database includes information on each of a plurality of applications installed in the electronic device using at least one of a plurality of control information.

11. The method of claim 1, wherein the control information includes at least one of user related information or location information.

12. The electronic device of claim 6, wherein the control information includes at least one of user related information or location information.

13. The electronic device of claim 9, wherein the control information includes at least one of user related information or location information.

* * * * *